(12) United States Patent
Soman et al.

(10) Patent No.: US 9,218,494 B2
(45) Date of Patent: Dec. 22, 2015

(54) SECURE CLIENT DRIVE MAPPING AND FILE STORAGE SYSTEM FOR MOBILE DEVICE MANAGEMENT TYPE SECURITY

(71) Applicant: Citrix Systems, Inc., Fort Lauderdale, FL (US)

(72) Inventors: Sisimon Soman, Fort Lauderdale, FL (US); ShivaKumar Krishnamurthy, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 126 days.

(21) Appl. No.: 14/054,899

(22) Filed: Oct. 16, 2013

(65) Prior Publication Data
US 2015/0106946 A1    Apr. 16, 2015

(51) Int. Cl.
G06F 11/30      (2006.01)
G06F 21/60      (2013.01)
G06F 21/62      (2013.01)

(52) U.S. Cl.
CPC .......... G06F 21/602 (2013.01); G06F 21/6245 (2013.01); G06F 21/6272 (2013.01); G06F 2221/2143 (2013.01)

(58) Field of Classification Search
CPC ......... G06F 21/10; G06F 21/26; G06F 21/78; G06F 21/60; G06F 21/6245; G06F 21/64; G06F 21/62; G06F 21/6272; G06F 2221/2143
USPC ................. 726/26–27, 30; 713/189, 193–194
See application file for complete search history.

(56) References Cited

U.S. PATENT DOCUMENTS

| 6,697,839 | B2 * | 2/2004 | Sini et al. ................... 709/203 |
| 7,155,465 | B2 | 12/2006 | Lee et al. |
| 7,400,891 | B2 * | 7/2008 | Aaron ........................ 455/456.4 |
| 7,421,443 | B2 | 9/2008 | Rajan et al. |
| 7,957,532 | B2 * | 6/2011 | Chen et al. .................... 380/270 |
| 8,370,645 | B2 * | 2/2013 | Asnaashari .................. 713/193 |
| 8,442,983 | B2 | 5/2013 | Pawar |

(Continued)

FOREIGN PATENT DOCUMENTS

| WO | 2012172533 A1 | 12/2012 |
| WO | 2013034681 | 3/2013 |
| WO | 2013097612 A1 | 7/2013 |

OTHER PUBLICATIONS

"Keychain Services Programming Guide," Apple, Inc., Jun. 11, 2012 , accessed Oct. 23, 2013, from <https://developer.apple.com/library/mac/documentation/Security/Conceptual/keychainServConcepts/keychainServConcepts.pdf>.

(Continued)

*Primary Examiner* — Hosuk Song
(74) *Attorney, Agent, or Firm* — Banner & Witcoff, Ltd.

(57) ABSTRACT

Methods and systems for providing a secure client drive mapping and/or file storage for mobile device management type security may include executing a managed application for presentation on a mobile device, receiving a request to save a data file locally on the mobile device, and determining whether the data file contains sensitive data are described herein. Subsequently, when the data file contains sensitive data and responsive to the request, the methods and system may also include encrypting the data file, storing the encrypted data file on the mobile device, and linking the encrypted data file to an unencrypted version of the data file, the unencrypted version of the data file not containing the sensitive data.

20 Claims, 8 Drawing Sheets

(56) References Cited

U.S. PATENT DOCUMENTS

| | | |
|---|---|---|
| 8,548,965 B2 | 10/2013 | Devarakonda et al. |
| 2003/0163715 A1 | 8/2003 | Wong |
| 2005/0138110 A1 | 6/2005 | Redlich et al. |
| 2006/0137010 A1 | 6/2006 | Kramer et al. |
| 2012/0054625 A1 | 3/2012 | Pugh et al. |
| 2012/0090035 A1 | 4/2012 | Mehta et al. |
| 2012/0143825 A1 | 6/2012 | Boehm et al. |
| 2013/0024695 A1 | 1/2013 | Kandrasheu et al. |
| 2013/0036233 A1 | 2/2013 | Orleth |
| 2013/0067232 A1 | 3/2013 | Cheung et al. |
| 2013/0179942 A1 | 7/2013 | Caplis et al. |
| 2013/0246485 A1 | 9/2013 | Pawar |
| 2013/0291055 A1* | 10/2013 | Muppidi et al. ............ 726/1 |

OTHER PUBLICATIONS

Jan. 5, 2015—(EP) International Search Report—App PCT/US14/60670.

* cited by examiner

US 9,218,494 B2

SECURE CLIENT DRIVE MAPPING AND FILE STORAGE SYSTEM FOR MOBILE DEVICE MANAGEMENT TYPE SECURITY

FIELD

Aspects of the disclosure relate to computer hardware and software. In particular, one or more aspects of the disclosure generally relate to computer hardware and software for providing a secure client drive mapping and/or file storage system for mobile device management type security.

BACKGROUND

Mobile devices (e.g., smart phones, tablet computers, other types of mobile computing devices, etc.) are becoming increasingly popular. More and more people are using mobile devices in personal and business settings for a variety of purposes. With operating systems, such as WINDOWS 8, software and hardware companies are providing mobile services, such as social network services, along with computing services, such as word processing applications, on a single mobile device.

Allowing both mobile and computing services on a single electronic device is risky for corporations who have employees traveling with confidential and/or sensitive company data on that mobile device. This is especially true when the local drives of the mobile device are mapped to the company's server and/or network. For example, an employee could upload files containing sensitive company data to a social networking site, thus creating a large security problem. Additionally, if an unwanted user obtained access to an employee's mobile device, the unwanted user may be able to access confidential information stored on the device in a mapped device drive.

Thus, there is a need to secure sensitive data stored on a mobile device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards providing a mobile device management type security for client device file storage and/or drive mapping.

One or more aspects of the disclosure provide for a method that may include executing a managed application for presentation on a mobile device, receiving a request to save a data file locally on the mobile device; and determining whether the data file contains sensitive data. Subsequently, when the data file contains sensitive data and responsive to the request, the method may also include encrypting the data file, storing the encrypted data file on the mobile device, and linking the encrypted data file to an unencrypted version of the data file, the unencrypted version of the data file not containing the sensitive data.

One or more aspects of the disclosure provide for a system that includes at least one processor and at least one memory storing instructions that may, when executed by the at least one processor, cause the system to perform steps. The steps the system performs may include executing a managed application for presentation on a mobile device, receiving a request to save a data file locally on the mobile device, and determining whether the data file contains sensitive data. Subsequently, when the data file contains sensitive data and responsive to the request, the instructions may further cause the system to perform encrypting the data file, storing the encrypted data file on the mobile device, and linking the encrypted data file to an unencrypted version of the data file, the unencrypted version of the data file not containing the sensitive data.

One or more aspects of the disclosure provide for one or more non-transitory computer-readable storage media having instructions stored thereon, that when executed by one or more processors, may cause the one or more processors to perform steps. The steps that the one or more processors may include executing a managed application for presentation on a mobile device, receiving a request to save a data file locally on the mobile device, and determining whether the data file contains sensitive data. Subsequently, when the data file contains sensitive data and responsive to the request, the instructions may further cause the one or more processors to perform encrypting the data file, storing the encrypted data file on the mobile device, and linking the encrypted data file to an unencrypted version of the data file, the unencrypted version of the data file not containing the sensitive data.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
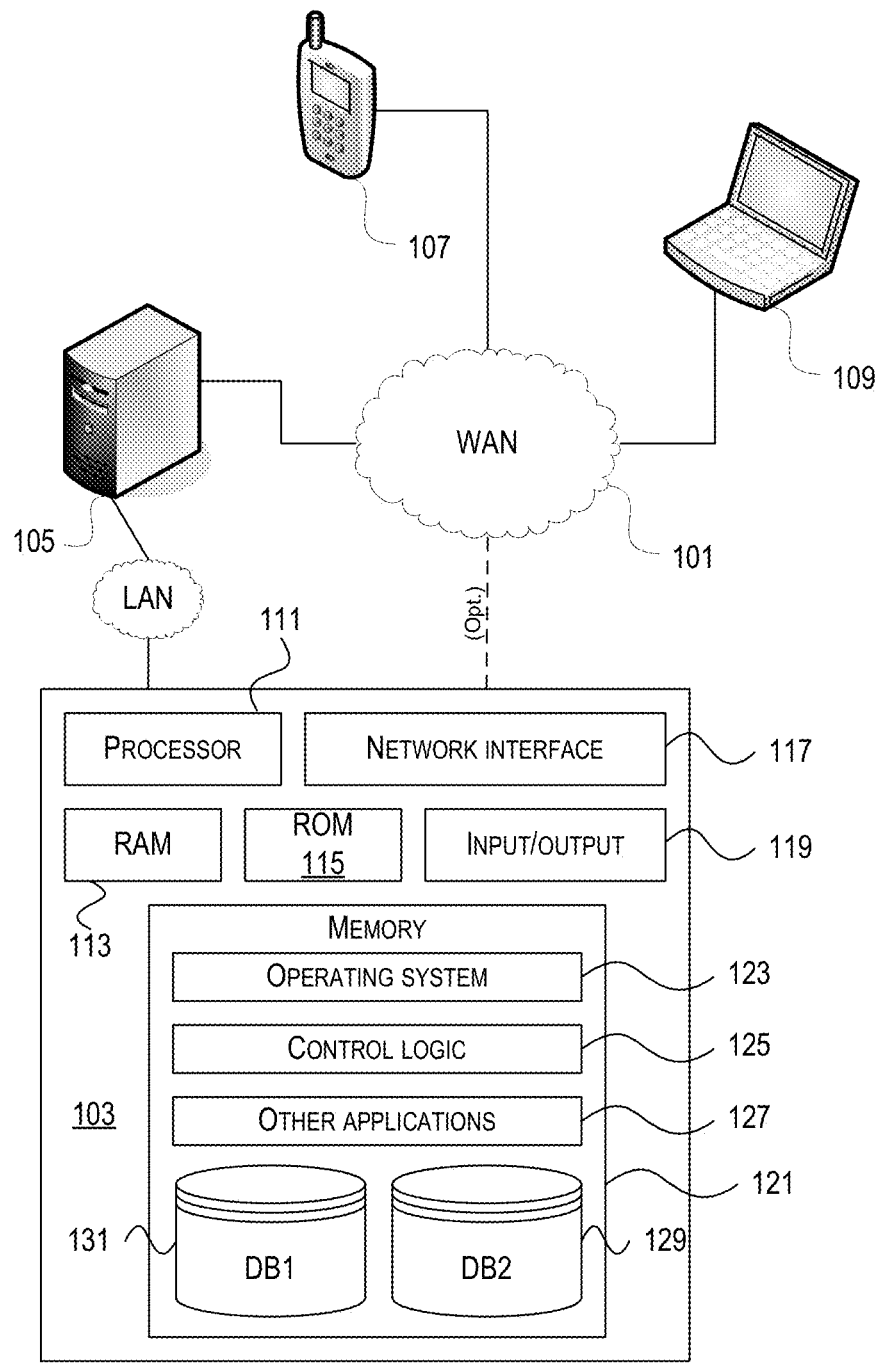
FIG. 1 depicts an illustrative computer system architecture that may be used in accordance with one or more illustrative aspects described herein.

Computer software, hardware, and networks may be utilized in a variety of different system environments, including standalone, networked, remote-access (a.k.a., remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
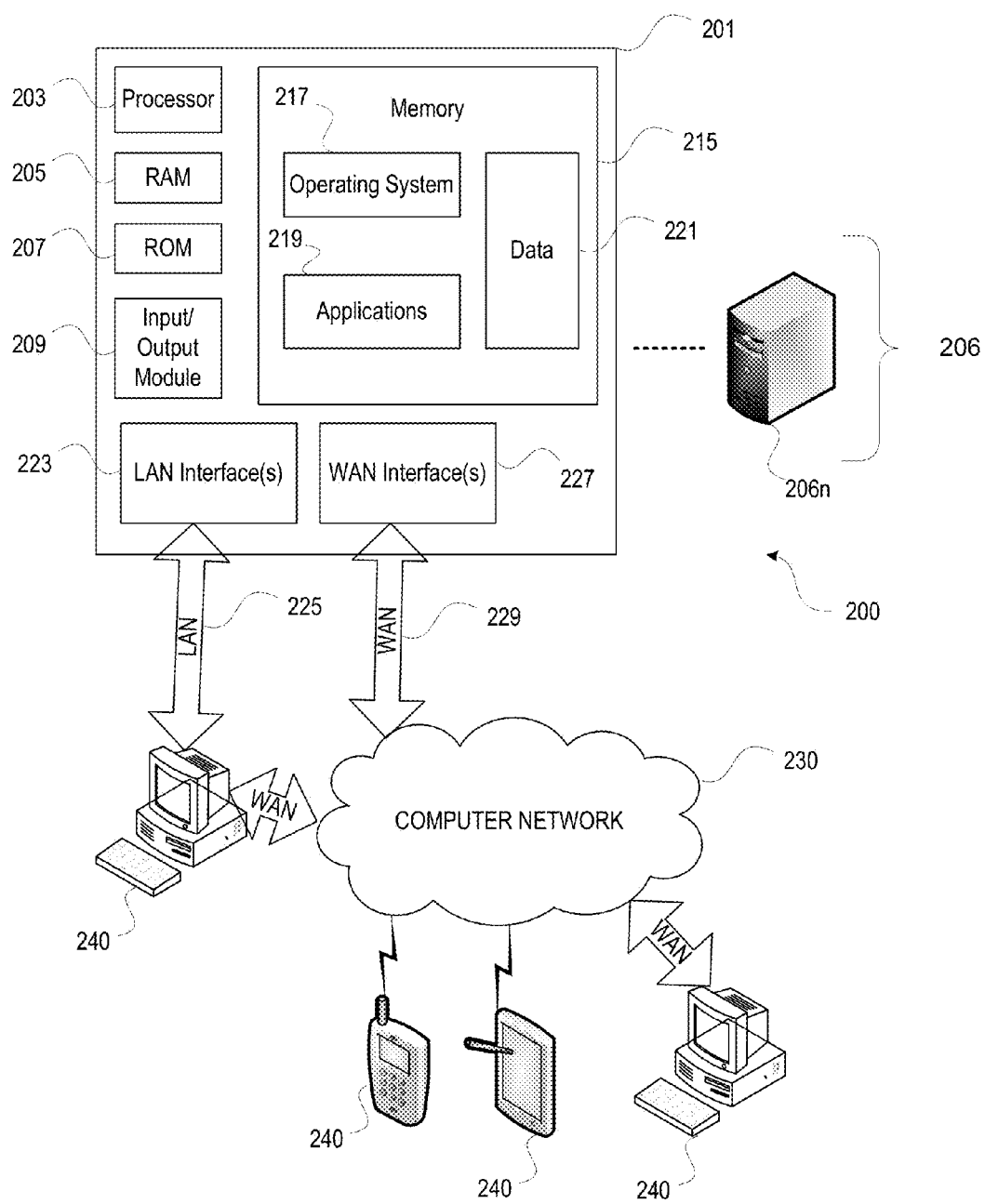
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
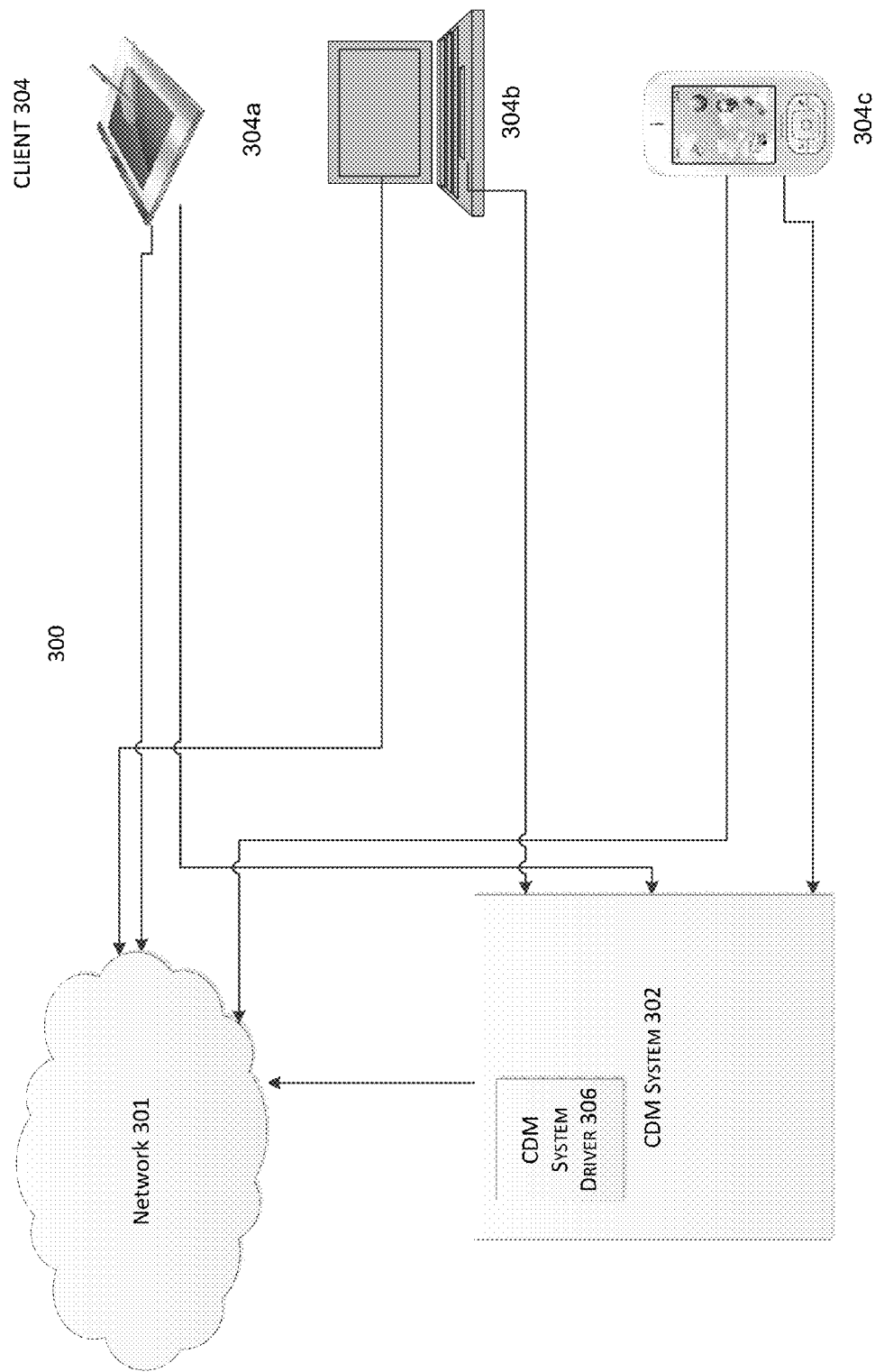
FIG. 3 depicts a block diagram illustrating a system for mobile device management type security for client drive mapping in accordance with one or more illustrative aspects described herein.

FIG. 3 shows a block diagram illustrating an example of a system 300 for mobile device management type security for client drive mapping in accordance with one or more disclosed features described herein. System 300 may include a network 301, a client drive mapping file system (CDM system) 302, and client 304.

Network 301 may be operated and/or managed by an enterprise, such as a corporation or business. Network 301 may allow a user of a client, such as client 304 to access enterprise or personal resources, such as files, from a client and use the client for personal use.

CDM system 302 may also include drivers, such as CDM system driver 306, system files, and network managers that may be operated in a user or kernel mode. CDM system 302 may use, for example, CDM service driver 306 to map client drives to enterprise drives or to drives of CDM system 302. Each component of CDM system 302 may interact with and/or be coupled to any other component of CDM system 302. CDM system 302 may be located on, for example, an enterprise server machine.

Client 304 may be any electronic computing device, such as a tablet 304a, laptop 304b, mobile phone 304c, and the like. Client 304 may be connected and/or coupled to CDM system 302, illustrated in FIG. 3 by the lines linking each of 304a, 304b, and 304c to CDM system 302. For example, CDM system 302 may be part of network 301, which may be an enterprise network. Client 304 may also connect to network 301 using, for example, a remote access connection.

System 300 may be used to map drives on client 304 to the enterprise drives associated with CDM system 302. Client drive mapping makes any directory mounted on a client device, including a CD-ROM, DVD or a USB memory stick, available to a user when the client device is connected to an enterprise network. When a server is configured to allow client drive mapping, users can access their locally stored files, work with them when connected to an enterprise network, and then save them again either on a local drive or on a drive on the server. Mapping of drives allows enterprise drives associated with CDM system 302 and local drives of client 304 to communicate with each other, such that reads and writes on client 304 may pass through CDM system 302. For example, after client 304 is connected to CDM system 302, and the drives on client 304 are mapped to the enterprise drives associated with CDM system 302, a request to save a file on client 304 using an application managed by CDM system 302 may pass the file's data to CDM system 302, and CDM system 302 may then write the file to a drive on client 304. After a drive has been mapped, an application running on a client can read and write files from a storage location, such as from an enterprise server machine, by accessing that drive, just as if that drive represented a local physical hard disk drive on a client, such as client 304.

Figure 4:
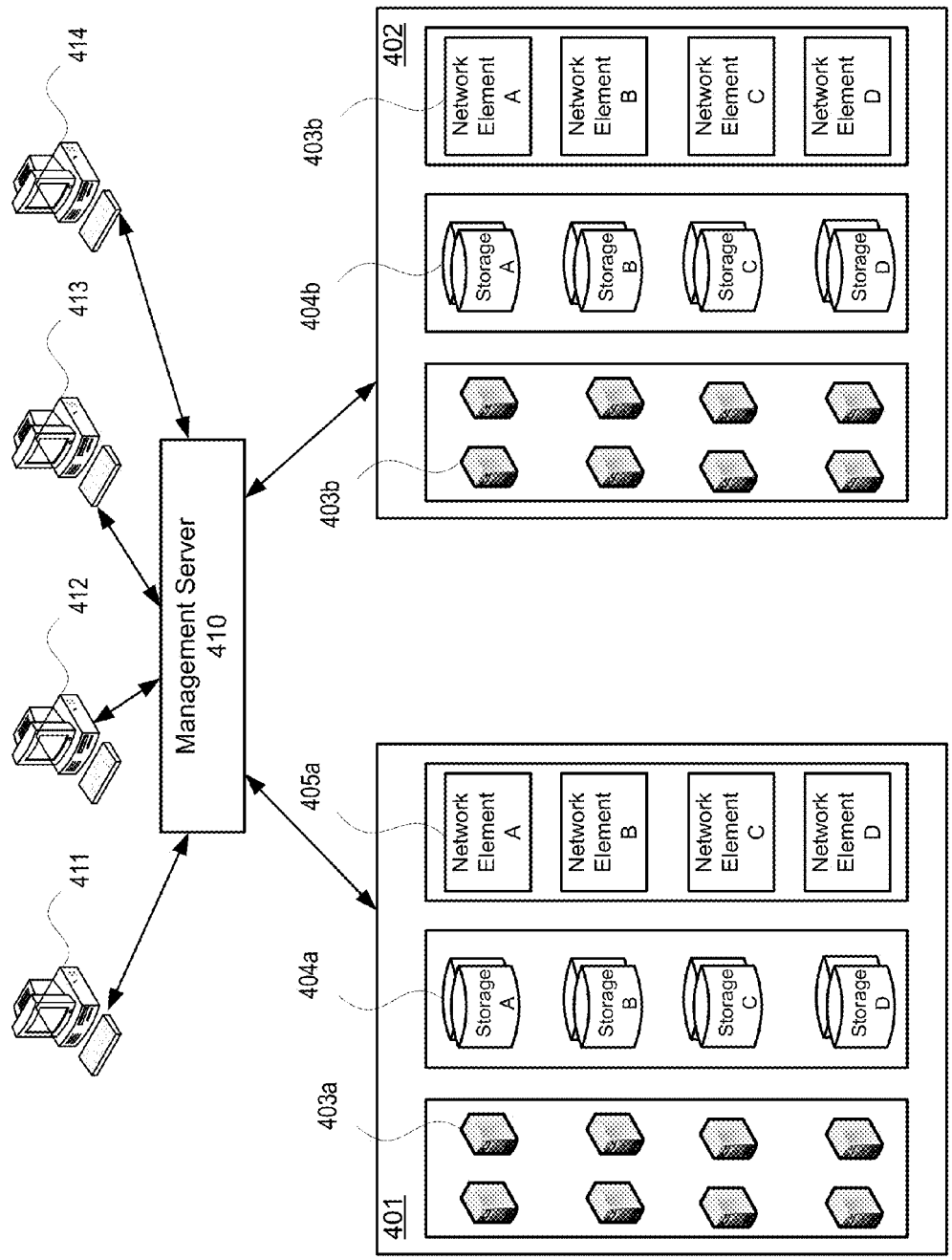
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WIN- DOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
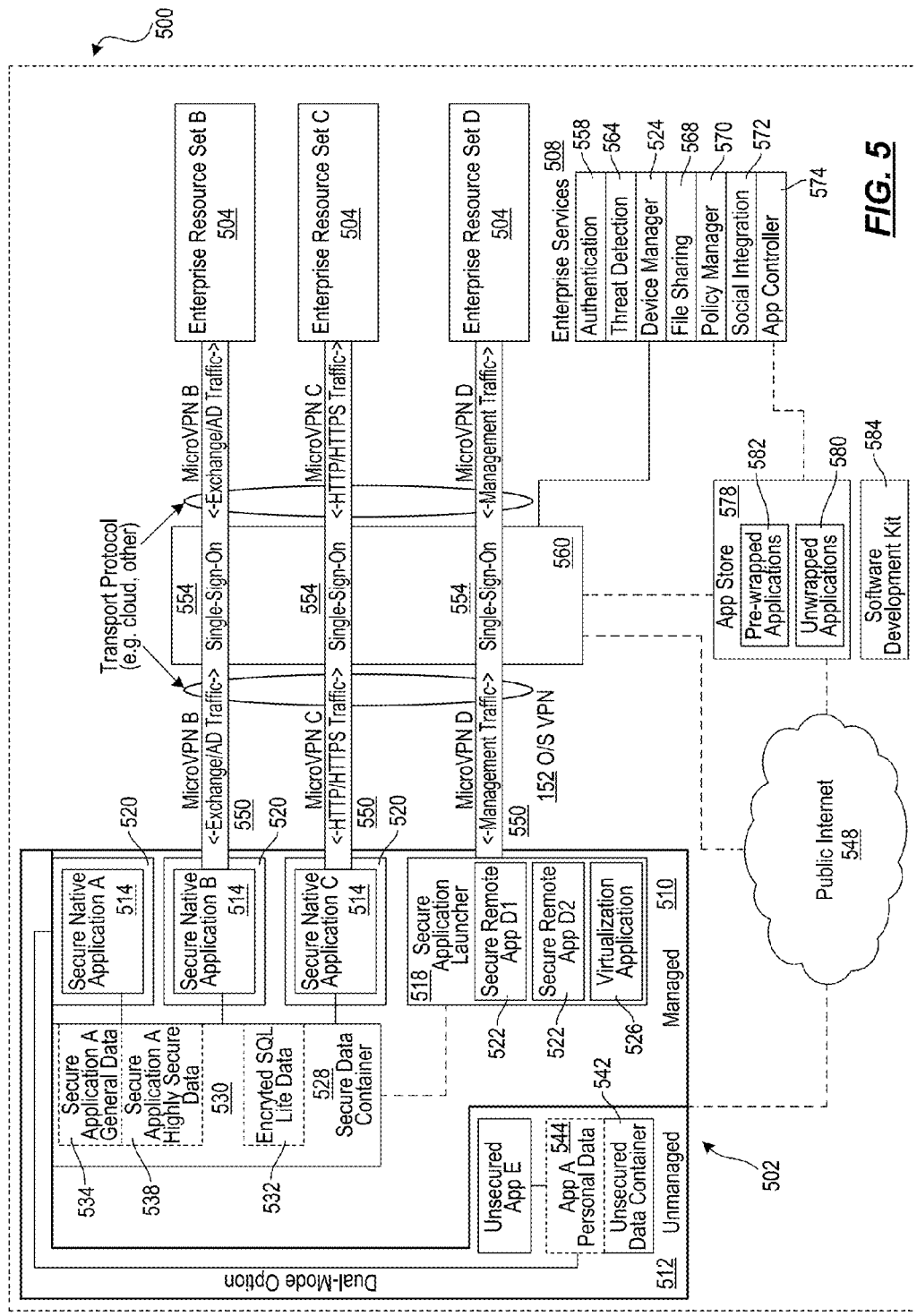
FIG. 5 depicts an illustrative enterprise mobility management system in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include metadata that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
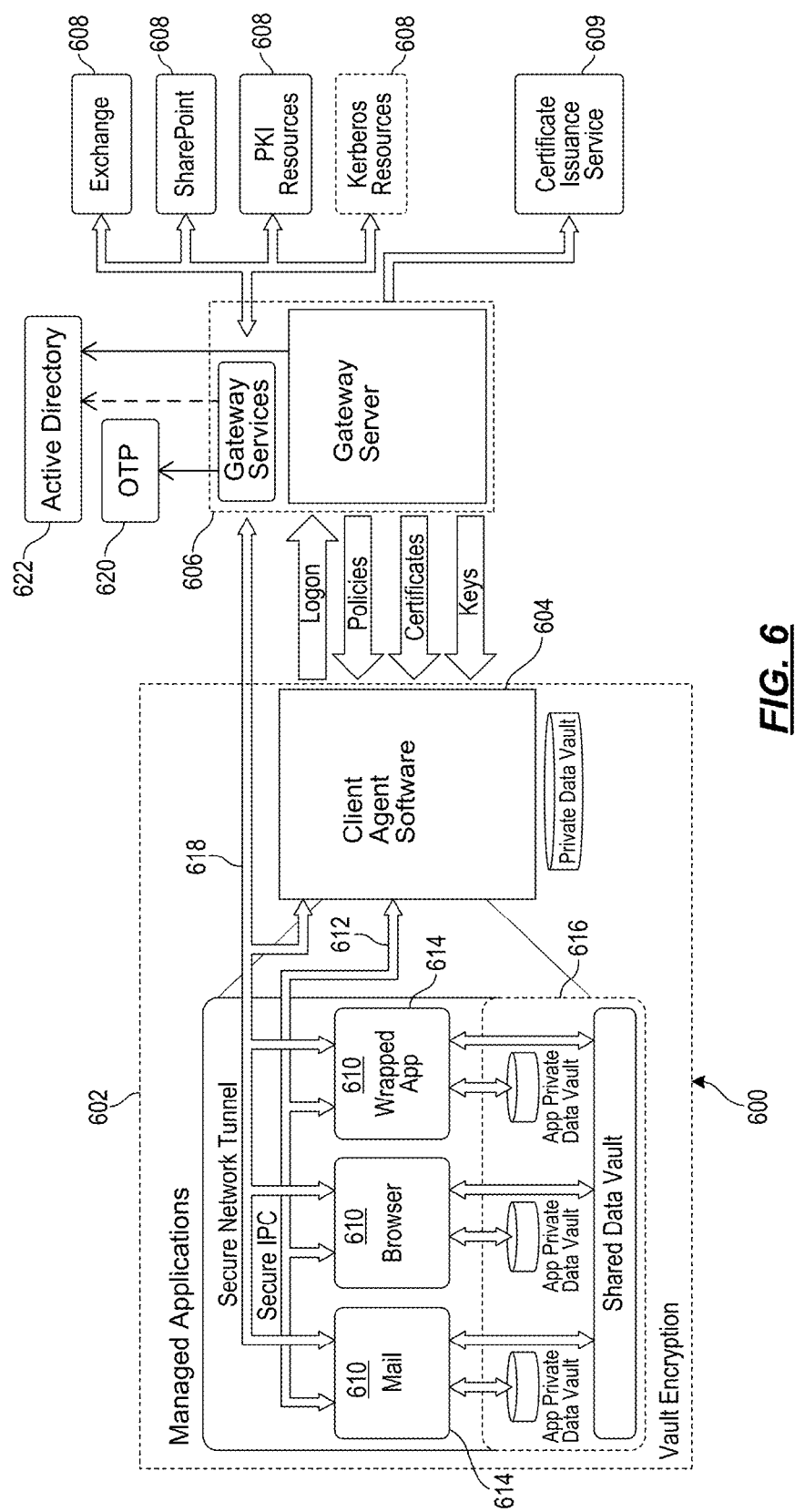
FIG. 6 depicts another illustrative enterprise mobility management system in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with client agent software 604, which interacts with cloud gateway 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an enterprise application store (e.g., StoreFront) for the selection and downloading of applications.

The client agent software 604 acts as the UI (user interface) intermediary for Windows apps/desktops hosted in an Enterprise data center, which are accessed using the HDX/ICA display remoting protocol. The client agent software 604 also supports the installation and management of native applications on the mobile device 602, such as native iOS or Android applications. For example, the managed applications 610 (mail, browser, wrapped application) shown in the figure above are all native applications that execute locally on the device. Client agent software 604 and Application Management Framework (AMF) of this architecture act to provide policy driven management capabilities and features such as connectivity and SSO (single sign on) to enterprise resources/services 608. The client agent software 604 handles primary user authentication to the enterprise, normally to the access gateway (AG) with SSO to other cloud gateway components. The client agent software 604 obtains policies from cloud gateway 606 to control the behavior of the AMF managed applications 610 on the mobile device 602.

The secure IPC links 612 between the native applications 610 and client agent software 604 represent a management channel, which allows client agent software to supply policies to be enforced by the AMF framework 614 "wrapping" each application. The IPC channel 612 also allows client agent software 604 to supply credential and authentication information that enables connectivity and SSO to enterprise resources 608. Finally the IPC channel 612 allows the AMF framework 614 to invoke user interface functions implemented by client agent software 604, such as online and offline authentication.

Communications between the client agent software 604 and cloud gateway 606 are essentially an extension of the management channel from the AMF framework 614 wrapping each native managed application 610. The AMF framework 614 requests policy information from client agent software 604, which in turn requests it from cloud gateway 606. The AMF framework 614 requests authentication, and client agent software 604 logs into the gateway services part of cloud gateway 606 (also known as NetScaler Access Gateway). Client agent software 604 may also call supporting services on cloud gateway 606, which may produce input material to derive encryption keys for the local data vaults 616, or provide client certificates which may enable direct authentication to PKI protected resources, as more fully explained below.

In more detail, the AMF framework 614 "wraps" each managed application 610. This may be incorporated via an explicit build step, or via a post-build processing step. The AMF framework 614 may "pair" with client agent software 604 on first launch of an application 610 to initialize the secure IPC channel and obtain the policy for that application. The AMF framework 614 may enforce relevant portions of the policy that apply locally, such as the client agent software login dependencies and some of the containment policies that restrict how local OS services may be used, or how they may interact with the application 610.

The AMF framework 614 may use services provided by client agent software 604 over the secure IPC channel 612 to facilitate authentication and internal network access. Key management for the private and shared data vaults 616 (containers) may be also managed by appropriate interactions between the managed applications 610 and client agent software 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through access gateway 606. The AMF framework 614 is responsible for orchestrating the network access on behalf of each application 610. Client agent software 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, cloud gateway 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein cloud gateway 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (cloud gateway 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the AMF framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the enterprise application store to be accessed in this manner. In this case, the client agent software 604 may require the user to set a custom offline password and the AD password is not used. Cloud gateway 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the AMF micro VPN feature). For example, an email application may utilize such a certificate. In this case, certificate-based authentication using ActiveSync (or other synchronization) protocol may be supported, wherein a certificate from the client agent software 604 may be retrieved by cloud gateway 606 and used in a keychain. Each managed application may have one associated client certificate, identified by a label that is defined in cloud gateway 606.

Cloud gateway 606 may interact with an enterprise special purpose web service to support the issuance of client certificates to allow relevant managed applications to authenticate to internal PKI protected resources.

The client agent software 604 and the AMF framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the AMF framework to mediate HTTPS requests).

AMF client certificate support on iOS may rely on importing a PKCS 12 BLOB (Binary Large Object) into the iOS keychain in each managed application for each period of use. AMF client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to cloud gateway 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Secure Client Drive Mapping and File Storage for Mobile Device Management Type Security for Client Drive Mapping In accordance with one or more disclosed features described herein, administrative control over confidential data and/or files saved to a client device may be provided by a program such as ZENPRISE or MICROSOFT SCCM. Administrative control may be provided over files written to a client drive, such that a management console, such as ZENPRISE, may monitor sensitive files in a client drive and/or remote clean/wipe out files from the client drive using policies.

In accordance with one or more disclosed features described herein, read and/or write commands to a client drive may operate through a CDM file system ("CDM system"), such as CDM system 302, which may reside on an enterprise server machine, such as XENDESKTOP SERVER. CDM system may encrypt the write commands to the client device using farm/enterprise specific key(s). While opening a file, CDM system may use a mechanism to differentiate if the file may have already been written or saved by using, for example, a driver, such as CDM driver 306, and/or may open an existing personal file from a client drive. For this purpose, CDM system may use a New Technology File System (NTFS) alternate stream ("file stream") or related mechanism, such as a change journal. Thus, after receiving a request to open a file, if a special or marked file stream is present in the file, the file may already have been saved by CDM system, and a portion of the file's file blocks may need to be decrypted before opening the file with an application, where the application may be a managed application.

In accordance with one or more features described herein, when a user may be modifying an existing personal file stored in client drive, CDM system may be denied access to writing to the same file. For example, after a user opens a file, such as the EXCEL file myfile.xsl, which may be located on the client drive, the user may copy sensitive or confidential information, such a corporate chart, into the spreadsheet (e.g., via cut & paste). When the user desires to save the modified file, CDM system may merge a copy of the existing unmodified file with any updated file blocks/data from the modified file, which may result in a new file being created that includes the updated file blocks/data. This new file may be separate from the existing unmodified file, and may be saved to the client drive in an encrypted form, which may be controlled by and/or accessed through CDM system. Then, if a user desires to open myfile.xsl using, for example, a locally installed version of an application, such as EXCEL, the unmodified file (i.e., myfile.xsl that does not contain the added sensitive or confidential information) may be opened and/or accessed. Alternatively or additionally, if a user desires to open myfile.xsl using a managed version of an application, such as EXCEL, which may be under CDM system's control, the new file (i.e., myfile.xsl that does contain the added sensitive or confidential information) may be opened and/or accessed. CDM system may use the file's metadata, such as a stream marking in a file stream or change journal, to link or point the unmodified file that does not contain the confidential data to the new file that contains the confidential data. Thus, CDM system may detect that a client is connected to CDM system, and in response to receiving a request to open an existing file, CDM system may determine if the file's metadata, such as in a file stream or change journal, includes a marker stream that includes a link to a version of the file containing confidential data, and if so, may provide the client access to the file containing confidential data.

Example features and processes consistent with disclosed embodiments are now discussed below in FIGS. 7 and 8.

Figure 7:
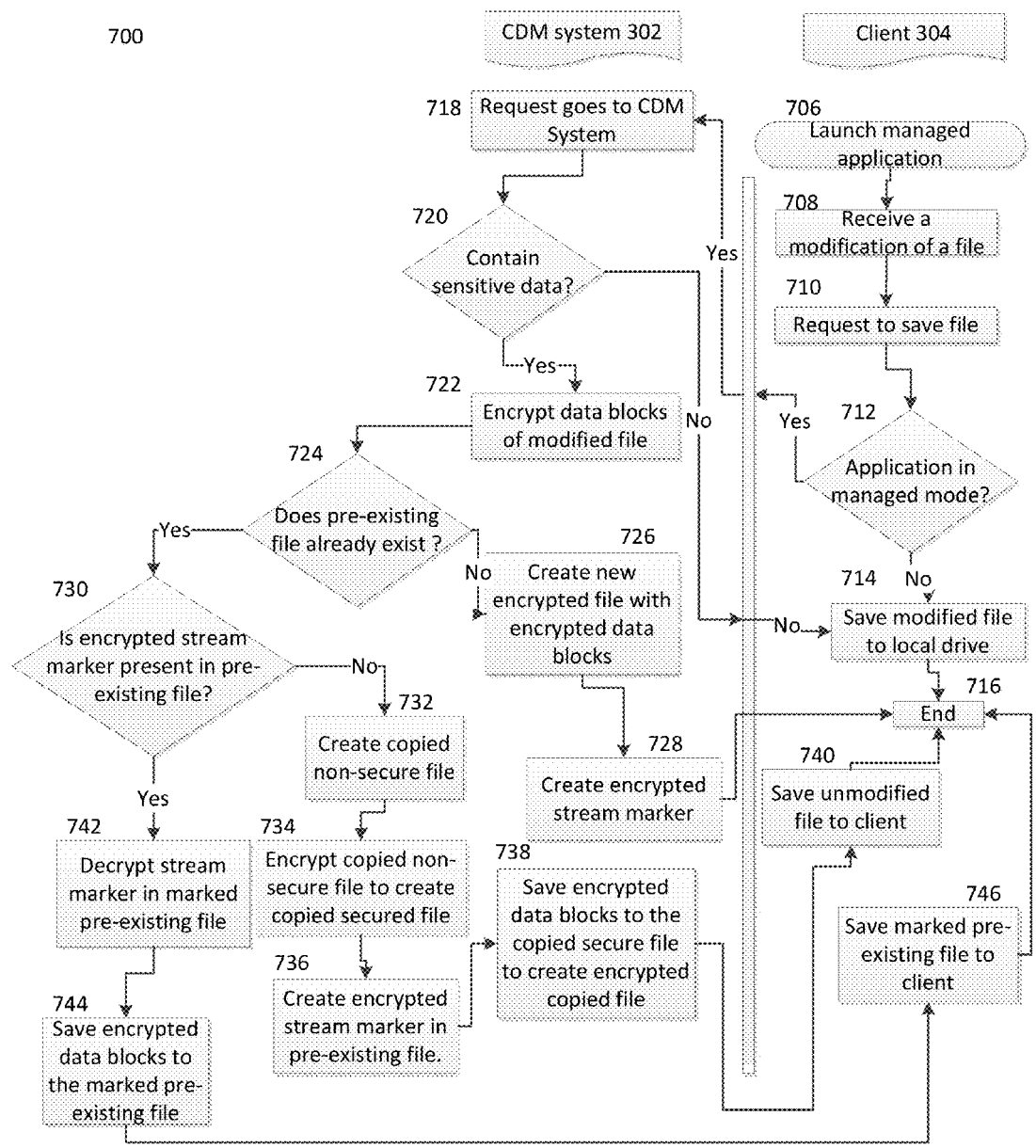
FIG. 7 depicts a flow diagram illustrating a process of saving a modified file to a mapped local drive using mobile device management type security for client drive mapping in accordance with one or more illustrative aspects described herein.

FIG. 7 is a flow diagram illustrating an example process 700 of saving a modified file to a mapped local drive using secure client drive mapping and file storage for mobile device management type security, in accordance with one or more disclosed features described herein. In one or more embodiments, the process illustrated in FIG. 7 and/or one or more steps thereof may be performed by a computing device (e.g., client device 304, enterprise server machine, and the like). In other embodiments, the process illustrated in FIG. 7 and/or one or more steps thereof may be embodied in computer-executable instructions that are stored in a computer-readable medium, such as a non-transitory computer-readable memory. In process 700, steps 706, 708, 710, 712, 714, 740, and 746 may be performed or executed on, for example, a client side, such as on client 304, and steps 718, 720, 722, 724, 726, 728, 730, 732, 734, 736, 738, 742, 744, and 746 may be performed or executed on for example, an enterprise server machine or CDM system side, such as on CDM system 302. Alternatively or additionally, any of the steps in process 700 may be performed on a client, enterprise server machine, or CDM system.

Process 700 may begin with step 706, in which an application, such as a spreadsheet or word processing program, may be loaded or launched on a client device, such as client 304. The application may be running an instance of the application being managed on a server, such as an enterprise server, that may be operably connected to CDM system 302. The managed application may, for example, be configured to provide at least one managed mode in which one or more policies are applied to the managed application, and the one or more policies may be configured to limit one or more functions of the managed application, as discussed above. The managed application may be loaded or launched in response to a request to access the managed application, such as from a user or other application. The managed application may be launched, by example, from a base virtual desktop or an enterprise delivered application. Alternatively or additionally, the application may be running on client 304. In step 708, a request to access and modify a file may be received. For example, client 304 may receive a request to access and modify one or more client resources, such as files and/or documents stored in a local drive on client 304. The local drive may be a mapped or unmapped drive. A modification may be, for example, entering data into a document or inserting confidential data, such as private company data, into the resource. The file may be modified when a user uses client 304, which may be connected to or associated with an enterprise server machine and/or CDM system 302, to receive and insert information from the enterprise server machine into the file. According to some embodiments, a user may log in to an enterprise machine or resource and download or save content from the enterprise machine or resource to a drive on a client, which then may be modified on client. According to some embodiments, a user may open a file on a client, and copy to that file sensitive information, which may be obtained from an enterprise server machine, for example.

In step 710, a request to save the modified file to client 304 may be received. Thus, after modification of the file, a user may desire to save the file locally before closing the application or shutting down the client.

In step 712, in response to receiving the request to save the modified file, a determination may be made, such as by client 304, of whether the application is running in a managed mode, such as managed by an enterprise, or if the application is not running in a managed mode. For example, client 304, running a managed application, may be connected to an enterprise server machine which may be connected to CDM system 302. In this case, client 304 may have its local drives mapped to the enterprise server machine associated with CDM system 302. Alternatively, client 304, not running a managed application, may not be connected to an enterprise server machine, and thus may not have its local drives mapped to the enterprise server machine associated with CDM system 302.

If it is determined at step 712 that the application may not be in a managed mode, process 700 continues to step 714. In step 714, the modified file may be saved to a local drive of client 304. For example, the modified file may override an existing file, or may be saved as a new file on local drive. The process then may end at step 716.

If it is determined at step 712 that the application may be in a managed mode, process 700 continues to step 718. In step 718, the request to save the modified file may be received by a CDM system, such as CDM system 302, which may be connected to or associated with an enterprise server machine. The local drives of client 304 may also be mapped to enterprise drives operably connected to CDM system 302.

After CDM system 302 receives from client 304 the request to save the modified file, it is determined at step 720 whether modified file contains confidential or sensitive data. Confidential data may be data sought to be protected by a company associated with the enterprise and/or CDM system 302. Confidential data may also include data that should not be accessed by anyone not approved to access it. The modification of the file at 708 may have inserted confidential data into the file. Thus, CDM system 304 may assess the inserted and/or modified data in the file to determine whether the modified file contains confidential data. CDM system 304 may also compare a pre-existing version of the file with the modified file to make this determination. Alternatively, CDM system 304 may determine that a file contains sensitive data anytime data is copied to the file from an enterprise-based source, e.g., from a file residing in enterprise storage, regardless of whether the copied data is actually confidential/sensitive or not. Alternatively, CDM system 304 may treat as confidential/sensitive any data that may have been entered, inserted, copied, pasted, typed, or the like into a file by, for example, a user using client 304. Alternatively, personnel associated with the enterprise and/or CDM system 302, such as network administrators or managers, may configure a level of security for the enterprise and/or CDM system 302, and the enforcement of this level of security may be used to help determine whether a file contains confidential/sensitive information. For example, if a security level is set to a higher, more restrictive level, then most data entered into a file may be considered confidential/sensitive. If, for example, a security level is set to a lower, less restrictive level, then most data entered into a file may not be considered confidential/sensitive. Additionally, the network administrators or managers may have the flexibility to add additional requirements/conditions for determining whether data entered into a file may be considered confidential/sensitive.

If it is determined at step 720 that the modified file may not contain confidential data, process 700 continues to step 714. In step 714, the modified file may be saved to a local drive of client 304. For example, the modified file may override an existing file, or may be saved as a new file on local drive. The process then may end at step 716.

It is determined at step 720 that the modified file may contain confidential data, process 700 continues to step 722. In step 722, the modified file or a portion of the modified file may be encrypted, creating an encrypted modified file. Thus, the portion of the file containing the confidential data may be encrypted and/or additional portions may be encrypted. The encrypted portion may comprise encrypted data blocks. Any encryption algorithm may be used to perform the encryption. The modified file may be encrypted using a farm-specific encryption key. For example, a farm-specific private encryption key may be an encryption key generated for a particular enterprise, for computing devices connected to a particular enterprise, or for a group of servers used to maintain an enterprise server machine system. The encryption key may be specific for a client device, such as client device 304, and/or be specific for a CDM system, such as system 302. The encryption key may also be stored on the enterprise server machine or CDM system 302.

In step 724, it is determined whether a pre-existing version of the modified file may exist on, for example, the enterprise server machine, which may be operably coupled to CDM system 302. For example, if at step 708, when a user may access and modify the file, the user may open the file from the enterprise server machine using, for example, an application managed by the enterprise server machine. Alternatively or additionally, a file may have been initially created on client 304, and thus a version of the file may not exist on the enterprise server machine. The pre-existing version of the modified file may not contain the modification received in step 708 and/or any confidential data.

If it is determined at step 724 that a pre-existing version of the modified file may not already exist on the enterprise server machine, process 700 continues to step 726. In step 726, CDM system 302 may create a new encrypted file from the encrypted modified file, and store it on the enterprise server machine. For example, the new encrypted file may include encrypted data blocks corresponding to confidential data and/or any other data in the file.

In step 728, a portion or all of the new encrypted file's metadata may be encrypted. Metadata that may describe properties of the file and may include the encryption key used in the encryption of the modified file. The metadata may include or be associated with a file stream and/or a change journal. File streams and change journals may be metadata that may be associated with a file, so that after an application requests to open a file, for example, the metadata, such as a file stream or change journal, associated with the file may be read. In some embodiments, the file stream may be encrypted, so, for example, an application, which may not be in a managed mode, may not be able to determine, for example, a location of a file stored in the file stream. In this aspect, a managed application may be able to decrypt the file stream such that, for example, a location of a file stored in the file stream may be determined. This aspect will be discussed further below. The metadata, file stream, and/or change journal may include or be associated with a stream marker that may include a name of a file, may point to a file, and/or indicate a location or how to access a file, which may be stored on the enterprise server machine and/or client 304. The stream marker may be encrypted in step 728. For example, the marker may signal to a managed application, client device 304, the enterprise server machine, or CDM system 302, whether to access an unencrypted or encrypted version of a data file. This aspect will be discussed further below. The marker may indicate whether the new encrypted file contains confidential data. Also, more than one marker may be included in the metadata, which may point to different files that may include different confidential data. Additionally, the farm-specific encryption key used to encrypt the modified file at step 722 may be included in the new encrypted file's metadata and be encrypted in step 728. Further, the new encrypted file's metadata may be encrypted using a farm-specific encryption key, which may be the same or different than other encryption keys disclosed herein, such as the farm-specific encryption key used to encrypt the modified file at step 722. For example, the farm-specific private encryption key used to encrypt the metadata may be an encryption key generated for a particular enterprise, for computing devices connected to a particular enterprise server machine, or for a group of servers used to maintain an enterprise server machine system. The encryption key used to encrypt the metadata may be specific for a file, client device, such as client device 304, and/or be specific for a CDM system, such as CDM system 302. The encryption key used to encrypt the metadata may be stored on the enterprise server machine or CDM system 702. The new encrypted file may then be saved on, for example, client 304 or the enterprise server machine.

If it is determined at step 724 that a pre-existing version of the modified file may already exist on the enterprise server machine, process 700 continues to step 730. In step 730, it is determined if the pre-existing file includes an encrypted marker in, for example, the metadata of the pre-existing file. The marker may be included in a file stream or change journal included in or associated with the pre-existing file's metadata.

If it is determined at step 730 that the pre-existing file may not include an encrypted marker, process 700 continues to step 732. In step 732, a copy of the pre-existing file ("copied non-secure file"), which may include confidential data, may be created on CDM system 302 or the enterprise server machine.

In step 734, the copied non-secure file may be encrypted to create a copied secured file. Additionally, the farm-specific encryption key used to encrypt the modified file at 722 may be included in the copied secured file's metadata. Further, the copied secured file's metadata may be encrypted using a farm-specific encryption key, which may be the same or different than other encryption keys disclosed herein, such as the farm-specific encryption key used to encrypt the modified file at step 722.

In step 736, a portion or all of the pre-existing file's metadata may be encrypted creating a marked unmodified file. For example, an encrypted marker may be created and/or included in the metadata. The encrypted marker may be included in a file stream or change journal included in or associated with the metadata of the marked unmodified file. The marker may link or point the marked unmodified file to the copied secured file. For example, the marker may signal to, for example, a managed application, client device 304, the enterprise server machine, and/or CDM system 302, whether to access the copied secured file after receiving a request to open the marked unmodified file. This aspect will be discussed further below. The marker may indicate whether the marked unmodified file contains confidential data. Also, more than one marker may be included in the metadata. Additionally, farm-specific encryption keys used to encrypt files may be included in the marked unmodified file's metadata and be encrypted in step 736. Further, the marked unmodified file's metadata may be encrypted using a farm-specific encryption key, which may be the same or different than other encryption keys disclosed herein, such as the farm-specific encryption key used to encrypt the modified file at step 722. For example, the farm-specific private encryption key used to encrypt the marked unmodified file's metadata may be an encryption key generated for a particular enterprise, for computing devices connected to a particular enterprise server machine, or for a group of servers used to maintain an enterprise server machine system. The encryption key used to encrypt the marked unmodified file's metadata may be specific for a file, client device, such as client device 304, and/or be specific for a CDM system, such as CDM system 302. The encryption key used to encrypt the marked unmodified file's metadata may be stored on the enterprise server machine or CDM system 702. The marked unmodified file may then be stored on a client, such as client 304. Alternatively or additionally, the marked unmodified file may be stored on CDM system 702 or the enterprise server machine.

In step 738, the portions of the modified file that may have been encrypted at 722 may be merged with or saved to the copied secured file to create an encrypted copied file. The encrypted copied file may be stored on the enterprise server machine, CDM system, such as CDM system 302, and/or on a client, such as client 304. The marked unmodified file created in step 736 may include a marker that points to this newly created encrypted copied file, such that after receiving a request to open the marked unmodified file on a client, the marked unmodified file's marker may point and/or allow access to the encrypted copied file. This aspect will be described further below.

In step 740, the marked unmodified file may then be stored on a client, such as on client 304, in a mapped local drive. The process may then end at step 716.

If it is determined at step 730 that the pre-existing file may include an encrypted marker ("marked pre-existing file"), process 700 continues to step 742. In step 742, the stream marker may be decrypted using an encryption key, such as a farm-specific encryption key, which may be the same or different than other encryption keys disclosed herein, such as the farm-specific encryption key used to encrypt the modified file at step 722. Decrypting the steam marker allows for a modification of the marked pre-existing file.

In step 744, the portions of the modified file that may have been encrypted at 722 may be merged with or saved to the marked pre-existing file to create an updated marked file. The updated marked file may be stored on the enterprise server machine, CDM system, such as CDM system 302, and/or on a client, such as client 304. The marked pre-existing file may include a stream marker that points to this updated marked file, such that after receiving a request to open the marked pre-existing file on a client, the marked pre-existing file's marker may point and/or allow access to the updated marked file. This aspect will be described further below.

In step 746, the marked pre-existing file may then be stored on a client, such as on client 304, in a mapped local drive. The process may then end at step 716.

Figure 8:
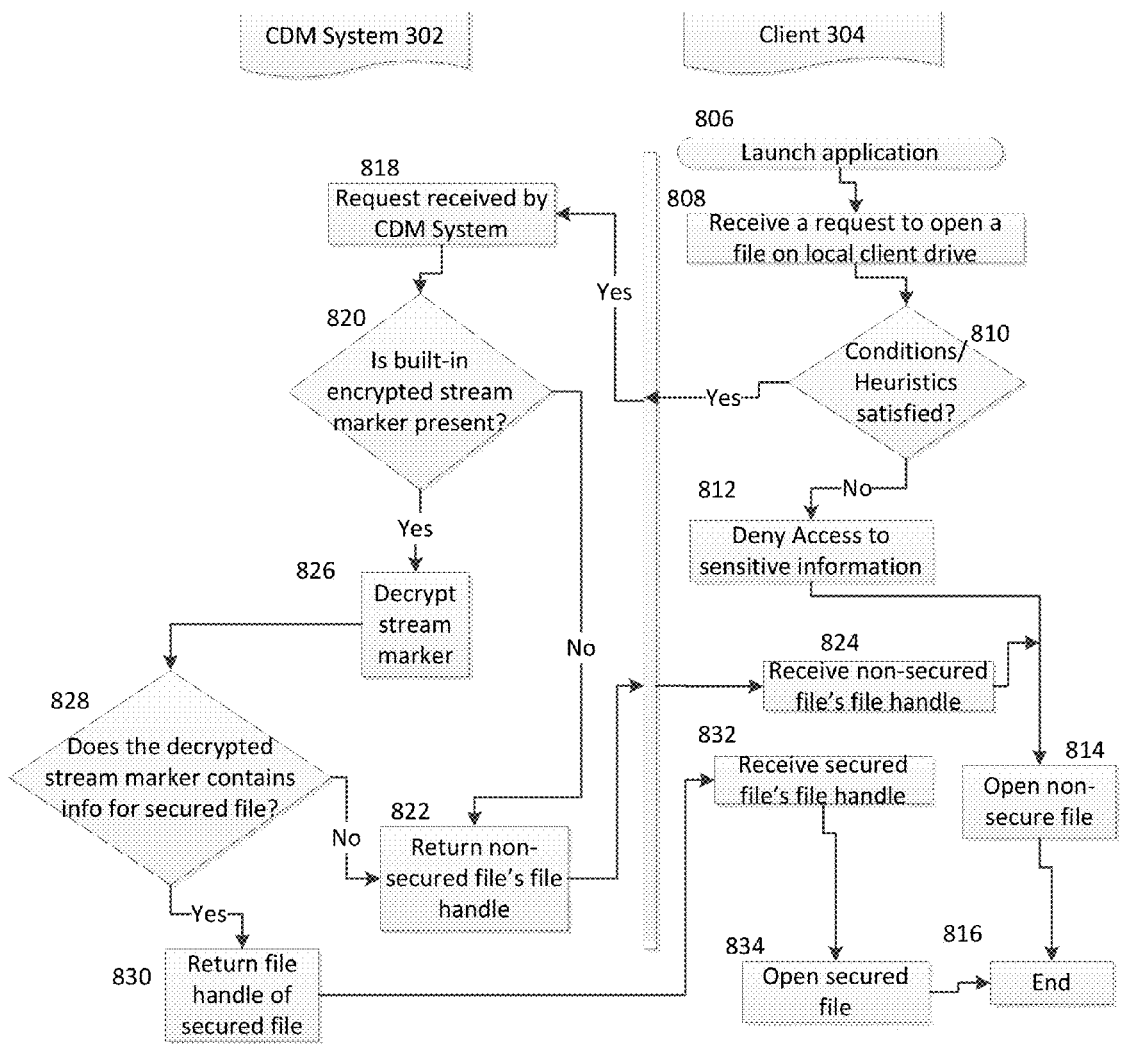
FIG. 8 depicts a flow diagram illustrating a process of opening a file on a client using mobile device management type security for client drive mapping in accordance with one or more illustrative aspects described herein.

FIG. 8 is a flow diagram illustrating an example process 800 of opening a file on a client, such as client 304, using secure client drive mapping and file storage for mobile device management type security, in accordance with one or more disclosed features described herein. In one or more embodiments, the process illustrated in FIG. 8 and/or one or more steps thereof may be performed by a computing device (e.g., client device 304, enterprise server machine, and the like). In other embodiments, the process illustrated in FIG. 8 and/or one or more steps thereof may be embodied in computer-executable instructions that are stored in a computer-readable medium, such as a non-transitory computer-readable memory. In process 800, steps 806, 808, 810, 812, 814, 824, 832, and 834 may be performed or executed on, for example, a client side, such as on client 304, and steps 818, 820, 822, 826, 828, and 830 may be performed or executed on for example, an enterprise server machine or CDM system side, such as CDM system 302. Alternatively or additionally, any of the steps in process 800 may be performed on a client, enterprise server machine, or CDM system.

Process 800 may begin with step 806, in which an application, such as a spreadsheet or word processing program, may be loaded or launched on a client device, such as client 304. The application may be running an instance of the application being managed on a server, such as an enterprise server, that may be operably connected to CDM system 302. The managed application may, for example, be configured to provide at least one managed mode in which one or more policies are applied to the managed application, and the one or more policies may be configured to limit one or more functions of the managed application, as discussed above. The managed application may be loaded or launched in response to a request to access the managed application, such as from a user or other application. The managed application may be launched, by example, from a base virtual desktop or an enterprise delivered application. Alternatively or additionally, the application may be running on client 304.

In step 808, a request to access or open a pre-existing file stored on a local device drive may be received on a client device, such as client 304. For example, a user or other application may make such a request. The local device drive may be mapped to an enterprise drive using a CDM system, such as CDM system 302.

In step 810, in response to receiving the request to access or open a pre-existing file stored on, for example, a local drive of client 304, a determination may be made, such as by client 304, CDM system 302, or an enterprise server machine, of whether one or more conditions or heuristics may be satisfied to, for example, access sensitive or confidential information that may be linked to or associated with the pre-existing file. The sensitive or confidential information may be included in a file stored on the enterprise server machine. For example, the pre-existing file stored on client 304 may include a marker in the pre-existing file's metadata that may point to a file stored on the enterprise server machine. Thus, after a request to access or open the pre-existing file may have been received, and if one or more conditions are satisfied, then access to the file stored on the enterprise server machine may be granted. This aspect will be discussed further below. The conditions or heuristics may include whether the launched application may be a managed application; whether client 304 may be connected to CDM system 302 and/or the enterprise server machine; whether the pre-existing file may has a marker in, for example, the pre-existing file's metadata, which may point to another file; whether the pre-existing file may include encrypted metadata; whether the pre-existing file includes confidential or sensitive information; whether a portion of the pre-existing file's metadata is associated with or includes a file stream and/or change journal; whether a copy and/or paste event has occurred; whether the client is connected to a network through an application, such as CITRIX RECEIVER, and the like. According to some aspects, if some conditions may be met, certain information may be accessible while other information may not be accessible. For example, there may be a predetermined number of conditions that may be satisfied that may allow access to the full file, while a lower predetermined number of conditions may be satisfied that may allow access to a portion of the file.

If it is determined at step 810 that one or more of the conditions may not be satisfied, process 800 continues to step 812. In step 812, access may be denied to information, such as, for example, encrypted and/or confidential or sensitive information. Such information may be stored in a file stored on, for example, client 304, CDM system 302, or the enterprise server machine.

In step 814, the application, which may be running on a client like client 304, may then open a version of the pre-existing file that may not contain information such as, for example, encrypted and/or confidential or sensitive information (non-secured file). The non-secured file may be stored on, for example, client 304, CDM system 302, or on the enterprise server machine. The process then may end at step 816.

If it is determined at step 810 that one or more conditions may be satisfied, process 800 continues to step 818. In step 818, the request to open the pre-existing file may be received by a CDM system, such as CDM system 302, which may be connected to or associated with an enterprise server machine and/or a client, such as client 304.

After CDM system 302 receives from client 304 the request to open the pre-existing file, it is determined at step 820 whether the pre-existing file may contain encrypted metadata. For example, a stream marker may be present in a file stream or change journal included in or associated with the pre-existing file's metadata. The marker may also be encrypted. Accordingly, at step 820, it may be determined whether the pre-existing file contains such a marker.

If it is determined at step 820 that the pre-existing file may not include an encrypted marker, process 800 continues to step 822. In step 822, CDM system 302 may return the file handle of a version of the pre-existing file that may not contain information such as, for example, encrypted and/or confidential or sensitive information (non-secured file). The file handle may provide an indicator for accessing the non-secured file.

In step 824, the application, which may be running on the client, such as client 304, may receive the non-secured file's file handle.

In step 814, the application, which may be running on a client like client 304, may then open the non-secured file. The non-secured file may be stored on, for example, client 304, CDM system 302, or on the enterprise server machine. The process then may end at step 816.

If it is determined at step 820 that the pre-existing file's metadata may include an encrypted marker, such as in a file stream or a change journal, process 800 continues to step 826. In step 826, the encrypted marker may be decrypted using an encryption key, such as a farm-specific encryption key.

After the encrypted marker is decrypted in step 826, it is determined at step 828 whether the decrypted marker of the pre-existing file may contain information associated with a version of the pre-existing file that may include confidential or sensitive information (secured file). For example, the marker may include information associated with the secured file, and may point the pre-existing file to the secured file, and/or or may allow access to the secured file.

If it is determined at step 828 that the decrypted marker of the pre-existing file may not contain information associated with a secured version of the pre-existing file, process 800 continues to step 822. In step 822, CDM system 302 may return the file handle of a version of the pre-existing file that may not contain information such as, for example, encrypted and/or confidential or sensitive information ("non-secured file"). The file handle may provide an indicator for accessing the non-secured file.

In step 824, the application, which may be running on the client, such as client 304, may receive the non-secured file's handle.

In step 814, the application, which may be running on a client like client 304, may then open the non-secured file. The non-secured file may be stored on, for example, client 304, CDM system 302, or on the enterprise server machine. The process then may end at step 816.

If it is determined at step 828 that the decrypted marker of the pre-existing file may contain information associated with a secured version of the pre-existing file, process 800 continues to step 830. In step 830, CDM system 302 may return the file handle of a version of the pre-existing file that may contain information such as, for example, encrypted and/or confidential or sensitive information ("secured file"). The file handle may provide an indicator for accessing the secured file.

In step 832, the application, which may be running on the client, such as client 304, may receive the secured file's file handle.

In step 834, the application, which may be running on a client like client 304, may then open the secured version of the pre-existing file. This secured file may be stored on, for example, client 304, CDM system 302, or on the enterprise server machine. The process then may end at step 816.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   executing a managed application for presentation on a mobile device;
   receiving a request to save a data file locally on the mobile device; and
   determining whether the data file contains sensitive data;
   when the data file contains sensitive data and responsive to the request:
     encrypting the data file;
     storing the encrypted data file on the mobile device; and
     linking the encrypted data file to an unencrypted version of the data file, the unencrypted version of the data file not containing the sensitive data.

2. The method of claim 1, further comprising:
   receiving, at the mobile device, a request to open the encrypted data file;
   when a first predetermined condition is met, allowing access to the encrypted file; and
   when a second predetermined condition is met, allowing access to the unencrypted version of the data file.

3. The method of claim 1, wherein determining comprises detecting a modification of the data file when the data file is in use by the managed application.

4. The method of claim 3, wherein the modification comprises:
   connecting to an enterprise server machine;
   accessing enterprise information from the enterprise server machine;
   inserting the enterprise information into the data file; and
   when the sensitive data comprises the enterprise information:
     encrypting the enterprise information, and
     linking the encrypted enterprise information to the unencrypted version of the data file.

5. The method of claim 1, wherein the sensitive data comprises enterprise confidential data.

6. The method of claim 1, wherein the data file is encrypted by a host server using a first farm-specific encryption key.

7. The method of claim 6, wherein the first farm-specific key is stored in metadata associated with the unencrypted data file.

8. The method of claim 7, wherein the metadata is one of a file stream and a change journal associated with the unencrypted data file and the metadata is encrypted with a second farm-specific key.

9. A system, comprising:
   at least one processor; and
   at least one memory storing instructions that, when executed by the at least one processor, cause the system to perform:
     executing a managed application for presentation on a mobile device;
     receiving a request to save a data file locally on the mobile device; and
     determining whether the data file contains sensitive data;
     when the data file contains sensitive data and responsive to the request, the instructions further cause the system to perform:
       encrypting the data file;
       storing the encrypted data file on the mobile device; and
       linking the encrypted data file to an unencrypted version of the data file, the unencrypted version of the data file not containing the sensitive data.

10. The system of claim 9, the instructions further cause the system to perform:
    receiving, at the mobile device, a request to open the encrypted data file;
    when a first predetermined condition is met, allowing access to the encrypted file; and
    when a second predetermined condition is met, allowing access to the unencrypted version of the data file.

11. The system of claim 9, wherein determining comprises detecting a modification of the data file when the data file is in use by the managed application.

12. The system of claim 11, wherein the modification comprises:
    connecting to an enterprise server machine;
    accessing enterprise information from the enterprise server machine;
    inserting the enterprise information into the data file; and
    when the sensitive data comprises the enterprise information:

encrypting the enterprise information, and
linking the encrypted enterprise information to the unencrypted version of the data file.

13. The system of claim 9, wherein the sensitive data comprises enterprise confidential data.

14. The system of claim 9, wherein the data file is encrypted by a host server using a first farm-specific encryption key.

15. The system of claim 14, wherein the first farm-specific key is stored in metadata associated with the unencrypted data file.

16. The system of claim 15, wherein the metadata is one of a file stream and a change journal associated with the unencrypted data file and the metadata is encrypted with a second farm-specific key.

17. One or more non-transitory computer-readable storage media having instructions stored thereon, that when executed by one or more processors, cause the one or more processors to perform:
   executing a managed application for presentation on a mobile device;
   receiving a request to save a data file locally on the mobile device; and
   determining whether the data file contains sensitive data;
   when the data file contains sensitive data and responsive to the request, the instructions further cause the one or more processors to perform:
      encrypting the data file;
      storing the encrypted data file on the mobile device; and
      linking the encrypted data file to an unencrypted version of the data file, the unencrypted version of the data file not containing the sensitive data.

18. The one or more non-transitory computer-readable storage media of claim 17, the instructions further cause the one or more processors to perform:
   receiving, at the mobile device, a request to open the encrypted data file; and
   when a first predetermined condition is met, allowing access to the encrypted file; and
   when a second predetermined condition is met, allowing access to the unencrypted version of the data file.

19. The one or more non-transitory computer-readable storage media of claim 17, wherein determining comprises detecting a modification of the data file when the data file is in use by the managed application.

20. The one or more non-transitory computer-readable storage media of claim 19, wherein the modification comprises:
   connecting to an enterprise server machine;
   accessing enterprise information from the enterprise server machine; and
   inserting the enterprise information into the data file,
   wherein when the sensitive data comprises the enterprise information, the instructions further cause the one or more processors to perform:
      encrypting the enterprise information; and
      linking the encrypted enterprise information to the unencrypted version of the data file.

* * * * *